United States Patent
Thier et al.

(10) Patent No.: US 9,027,317 B2
(45) Date of Patent: May 12, 2015

(54) REEL MOWER GRASS CATCHER CARRIER

(75) Inventors: Richard D Thier, Juneau, WI (US); James E. Roach, Holly Springs, NC (US); Tracy T. Lanier, Garner, NC (US); Michael J. Buchheit, Apex, NC (US); Brent G. Rinholm, Fuquay-Varina, NC (US); Daniel R. Schneider, East Dubuque, IL (US)

(73) Assignee: Deere & Company, Moline, IL (US)

(*) Notice: Subject to any disclaimer, the term of this patent is extended or adjusted under 35 U.S.C. 154(b) by 0 days.

(21) Appl. No.: 13/601,269

(22) Filed: Aug. 31, 2012

(65) Prior Publication Data

US 2014/0059997 A1 Mar. 6, 2014

(51) Int. Cl.
*A01D 43/063* (2006.01)
*A01D 34/00* (2006.01)

(52) U.S. Cl.
CPC ............ *A01D 34/001* (2013.01); *A01D 43/063* (2013.01)

(58) Field of Classification Search
USPC ....................... 56/7, 194, 198–200, 202–206; 248/205.1, 318
See application file for complete search history.

(56) References Cited

U.S. PATENT DOCUMENTS

| | | | |
|---|---|---|---|
| 986,883 A | 3/1911 | Wessel | |
| 1,484,084 A * | 2/1924 | Rohrbach | 56/199 |
| 1,999,102 A * | 4/1935 | Kirby | 56/199 |
| 2,568,045 A * | 9/1951 | Weisert | 56/202 |
| 2,770,088 A | 11/1956 | McNamara | |
| 2,955,404 A * | 10/1960 | Strasel et al. | 56/202 |
| 2,983,095 A * | 5/1961 | Barth | 56/202 |
| 3,129,550 A * | 4/1964 | Waag | 56/199 |
| 3,408,801 A * | 11/1968 | Kroll | 56/199 |
| 3,516,233 A * | 6/1970 | Johnson, Jr. et al. | 56/6 |
| 3,691,740 A * | 9/1972 | Weber | 56/198 |
| 3,820,312 A * | 6/1974 | Robinson | 56/202 |
| 4,233,806 A | 11/1980 | Richardson | |
| 5,412,931 A * | 5/1995 | Reichen et al. | 56/199 |
| 5,533,326 A * | 7/1996 | Goman et al. | 56/7 |
| 6,237,313 B1 * | 5/2001 | Leden | 56/199 |
| 6,341,478 B1 | 1/2002 | Sallstrom et al. | |
| 6,351,929 B1 | 3/2002 | Gust et al. | |
| 7,310,930 B2 | 12/2007 | Percy et al. | |
| 7,600,365 B2 * | 10/2009 | Hibi et al. | 56/199 |
| 7,610,975 B1 | 11/2009 | Gust et al. | |
| 7,748,204 B2 | 7/2010 | Goman et al. | |
| 7,765,779 B2 | 8/2010 | Surridge et al. | |
| 7,845,152 B2 | 12/2010 | Surridge et al. | |
| 8,407,976 B2 * | 4/2013 | Percy et al. | 56/199 |
| 2011/0179759 A1 | 7/2011 | Goman et al. | |

FOREIGN PATENT DOCUMENTS

EP 1537769 A1 6/2005
EP 2181580 A1 5/2010

OTHER PUBLICATIONS

European Search Report dated Oct. 28, 2013 (4 pages).

* cited by examiner

*Primary Examiner* — Thomas B Will
*Assistant Examiner* — Joan D Misa

(57) ABSTRACT

A reel mower grass catcher carrier includes a bail having side rods under the left and right sides of a grass catcher, a front link having an inverted U-shape and having connected to the left and right side rods and a central portion extending forwardly in front of the grass catcher, and a hanger extending forwardly over the grass catcher and connected to the central portion of the front link. The grass catcher can be installed or removed from the side of the carrier while the bail, front link and hanger stay connected together.

12 Claims, 2 Drawing Sheets

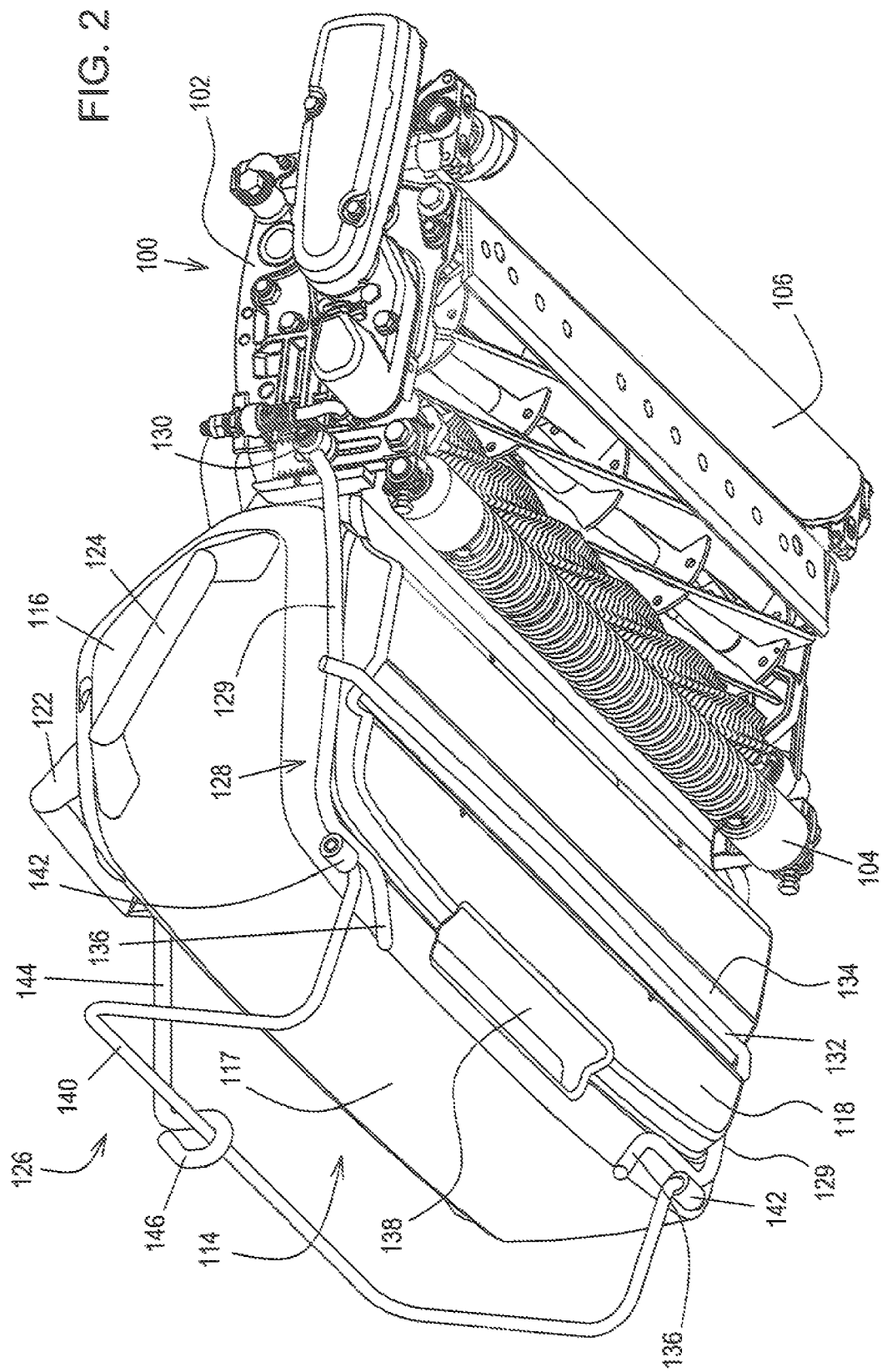

REEL MOWER GRASS CATCHER CARRIER

FIELD OF THE INVENTION

This invention relates generally to grass mowing equipment, and more specifically to a reel mower grass catcher carrier.

BACKGROUND OF THE INVENTION

Various mounting devices or grass catcher carriers have been used for reel mower cutting units. Typically, reel mower grass catchers are mounted directly in front of the cutting units to collect grass clippings discharged from the cutting units as they move forward in the mowing position.

Self-propelled grass mowing machines such as fairway mowers, trim mowers and triplex riding greensmowers commonly have a front row of two or three reel mower cutting units at the front of the machine or vehicle, followed by a rear row of one or more reel mower cutting units between the machine's front and rear wheels. One of the rear cutting units typically is located directly under the center of the vehicle frame. Access to grass catchers on front reel mower cutting units for installation and removal is relatively easy. However, access to grass catchers on rear cutting units, especially center rear cutting units under the vehicle frame, is substantially more difficult.

Some grass mowing machines have lift arms that can raise reel mower cutting units from a mowing mode to a transport mode. It may be necessary or desirable to install or remove a grass catcher from a reel mower cutting unit when the unit is either in a raised transport position or a lowered mowing position.

It also is important to mount a reel mower grass catcher so that it does not adversely affect the quality of cut. When a grass catcher collects clippings, it increases in weight. If the weight of the grass catcher is transferred to the cutting unit, it tends to reduce the height of cut. To avoid reducing the height of cut as the grass catcher's weight increases, some grass catcher mounting devices are designed to transfer most of the catcher's weight back onto the lift arm, instead of onto the reel mower cutting unit.

An example of a reel mower grass catcher carrier offered by Deere & Company on riding greensmowers includes a hook extending forwardly from the traction unit frame, connected to a handle on a bail under the grass catcher. The bail is pivotably mounted to the reel mower cutting unit, allowing the grass catcher to pitch on a horizontal axis with respect to the reel. The handle slides on the hook as the grass catcher yaws or steers with the cutting unit. To install, the grass catcher is positioned on the bail, then the hook is fastened or latched to the handle. To remove the grass catcher, the two actions are reversed. Disconnecting the hook from the handle is required to install or remove the grass catcher, and can be difficult for rear center cutting units under the vehicle frame.

Some other reel mower grass catcher carriers or mounting devices require the operator to fasten or unfasten hooks or latches from the grass catcher. Examples include U.S. Pat. No. 5,412,931, which relates to a slidable grass catcher with a laterally extending rail on the cutting unit, and a pair of hooks on the grass catcher that engage the rail. U.S. Pat. No. 6,237,313 relates to a grass catcher support assembly that includes upper and lower support members at each side of the cutting unit that support the grass catcher, with cables attached between the upper and lower support members. U.S. Pat. No. 7,765,779 relates to a latch mechanism for retaining a grass catcher on a reel mower cutting unit. The latch mechanism includes a latch plate releasably holding a rod end of the grass catcher in a slot on the reel mower cutting unit. U.S. Pat. No. 7,845,152 relates to a grass catcher retaining device for a reel mower cutting unit. A central support ring may be pivotably mounted to the top of the grass catcher and engages a wireform loop extending forwardly from a lift arm. Access to the hooks or latches can be difficult on grass catchers for rear cutting units under the vehicle frame.

Other self-propelled grass mowing machines provide access to rear center cutting units through the operator station, instead of from the side. For example, the rear center cutting unit may be positioned directly under the operator station, and/or the operator may use a flip-up foot rest to install or remove the grass catcher. The grass catchers rest on carriers designed for installation or removal of the grass catcher from above. For example, the grass catchers may have grooves located on their sides which interfit with upwardly extending horns on the reel mower cutting units. However, these carriers put most or all of the grass catcher's weight on the reel mower cutting unit, resulting in potential loss of cut quality. Examples include U.S. Pat. Nos. 5,533,326 and 6,341,478 which relate to a triplex greensmower having grass catcher mounted on a carrier frame in front of a reel mower cutting unit, with a pair of horns supporting the ends of the grass catcher.

Other self-propelled grass mowing machines may position the grass catcher in a carrier frame in front of the reel mower cutting unit. The weight of the grass catcher may be supported by the carrier frame which rides on a large roller in front of the cutting unit. The roller can flatten the grass, negatively affecting cut quality. Additionally, the grass catcher may not be fastened to the cutting unit, so the grass catcher may not be properly positioned for optimum collection. While a reel mower cutting unit pivots, it is important that the grass catcher remain close enough to the cutting unit so that grass clippings do not fall into a gap between the cutting unit and grass catcher.

Thus, a simple, low cost reel mower grass catcher carrier is needed that makes it simple for an operator to install and remove a grass catcher from under a vehicle. A reel mower grass catcher carrier is needed that facilitates installation or removal of the grass catcher when the cutting unit is in either the raised transport position or the lowered mowing position. A reel mower grass catcher carrier is needed in which the grass catcher is not supported by the cutting unit, and that does not negatively affect cut quality. A reel mower grass catcher carrier is needed that maintains the grass catcher in close proximity to the cutting unit.

SUMMARY OF THE INVENTION

A reel mower grass catcher carrier include a hanger extending over the grass catcher and pivotably supporting a front link spaced in front of the grass catcher. The front link pivotably supports a bail that extends under the grass catcher. The grass catcher rests on the bail in a grass collecting position and may be installed or removed from the grass collecting position by moving the grass catcher forwardly and upwardly from the bail while the hanger pivotably supports the front link and the front link pivotably supports the bail.

The reel mower grass catcher carrier makes it simple for an operator to install and remove a grass catcher from under a vehicle, and facilitates installation or removal of the grass catcher when the cutting unit is in either the raised transport position or the lowered mowing position. The grass catcher is not supported by the cutting unit, and does not negatively affect cut quality. The reel mower grass catcher carrier also maintains the grass catcher in close proximity to the cutting unit.

BRIEF DESCRIPTION OF THE DRAWINGS

FIG. 2 is a bottom perspective view of a reel mower grass catcher carrier according to a preferred embodiment of the invention.

DESCRIPTION OF THE PREFERRED EMBODIMENT

Figure 1:
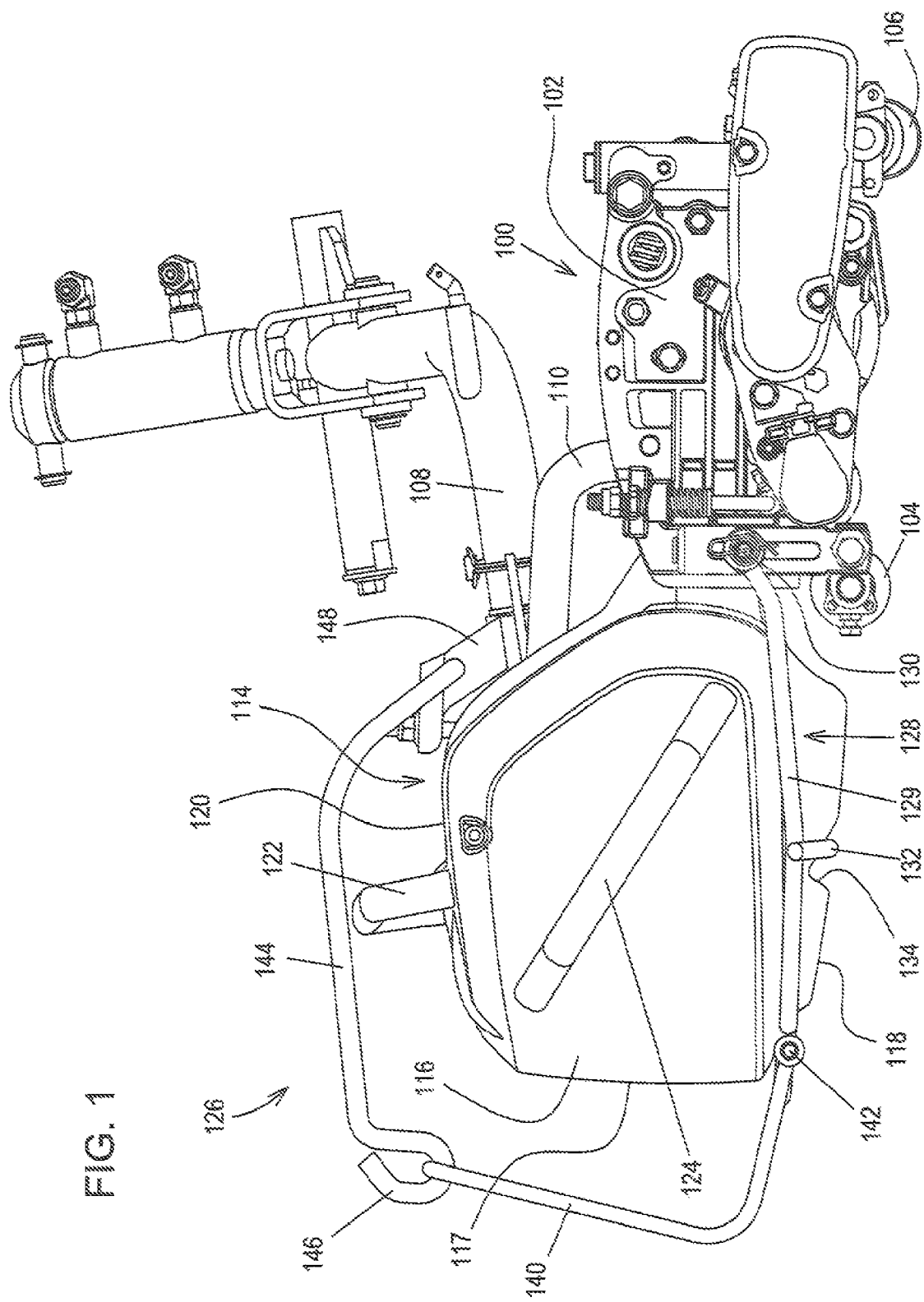
FIG. 1 is a side view of a reel mower grass catch carrier according to a preferred embodiment of the invention.

In one embodiment, reel mower cutting unit 100 includes a horizontally aligned cutting reel that interacts with a bedknife to cut grass with a scissoring action. The cutting reel may be rotated by an electric motor mounted to one of side panels 102 on the left and right sides of the cutting unit. Grass may be cut between rotating reel blades of cutting reel and a bedknife mounted between the side panels. Alternatively, the reel mower cutting unit may be driven directly or indirectly by the engine through a mechanical or hydrostatic transmission. The reel mower cutting unit rotates about a generally horizontal and laterally extending axis, and may be carried by front and rear rollers 104, 106 coupled to the side panels and contacting the ground during mowing operations. The front and rear rollers may be adjusted up or down to change the cutting height.

In one embodiment, the reel mower cutting unit may be pivotably attached to lift arm 108 that is connected to the frame of a triplex riding greensmower, fairway mower or trim mower. The reel mower cutting unit may be attached to the lift arm through yoke 110 which may pull the cutting unit during mowing operations, allowing the cutting unit to follow the contours of the ground surface and cut grass at a specified height.

In one embodiment, grass catcher 114 may be positioned directly in front of reel mower cutting unit 100. Grass catcher 114 may be a solid or flexible plastic structure with opposing sides 116, front wall or panel 117, lower wall or panel 118, and upper wall or panel 120. The lower wall or panel may extend over the front roller of the cutting unit. A rearward opening in the grass catcher may face the reel mower cutting unit to receive grass clippings discharged by the cutting unit. The grass catcher also may have one or more handles 122, 124 on the upper wall and side surfaces.

In one embodiment, reel mower cutting unit 100 may be mounted to a traction unit of a grass mowing machine having lift arm 108 that may be hydraulically or electrically actuated to raise the cutting unit from a mowing position to a transport position. Reel mower grass catcher carrier 126 may be used for a reel mower cutting unit, especially for a center rear reel mower cutting unit located between the front and rear wheels of a vehicle, under the center of the vehicle frame.

In one embodiment, reel mower grass catcher carrier 126 may include bail 128 pivotably attached to a reel mower cutting unit so that the bail may pivot on a horizontal axis. The grass catcher may rest on the bail in the grass collecting position as shown in FIGS. 1 and 2. Bail 128 may include a pair of side rods 129 extending fore and aft along the left and right sides of the grass catcher. At least part of the bottom surface 118 of the grass catcher may extend below the bail side rods 129. Each of bail side rods 129 may be attached with pivot mount 130 to one of the left and right side panels 102 of the cutting unit. With the grass catcher in the grass collecting position, bail side rods 129 may extend forwardly from the side panels along or under a shoulder surface of the lower wall or panel 118 of the grass catcher. Bail cross rod 132 may extend transversely between the pair of bail side rods 129 and may be secured or attached between the pair of bail side rods. With the grass catcher in the grass collecting position, bail cross rod 132 may fit under and into groove 134 in the lower wall or panel of the grass catcher between the grass catcher's left and right sides. The bail cross rod may help locate the grass catcher relative to the cutting unit. Additionally, the forward ends of bail side rods 129 may include locator horns 136. The locator horns may extend forwardly from the side rods and from the grass catcher, and may be separated by at least the width of grip 138 or handle in the front end or lower wall or panel of the grass catcher. The locator horns may assist the operator to guide the grass catcher forwardly during removal, and back into position during installation.

In one embodiment, reel mower grass catcher carrier 126 may include front link 140. The front link may be an inverted U-shaped rod having first and second ends attached by pivot mounts 142 to bail 128 at or adjacent the forward ends and/or locator horns of the bail side rods. Front link 140 may be pivotably fastened to the bail at or near the sides of the grass catcher, rather than at the center of the bail directly in front of the grass catcher. Fastening front link 140 to the bail at or near the sides of the grass catcher provides a gap for an operator to access the grass catcher from the front of the carrier. Front link 140 also may have a central portion extending generally upwardly in front of the grass catcher.

On one embodiment, reel mower grass catcher carrier 126 may include hanger 144 fastened to reel mower cutting unit lift arm 108. The hanger may be fastened to the lift an rigidly with bracket 148. Hanger 144 may extend forwardly from the lift arm over the top of the grass catcher and may be attached to front link 140. The hanger pivotably supports front link 140, and the front link pivotably supports the bail, so these components transfer weight of the grass catcher to the lift arm. The front link may rest in and be supported by closed loop 146 at the forward end of the hanger, providing a sliding joint therebetween. The sliding joint may allow the grass catcher to rotate during turns. The angle of the hanger relative to the lift arm may be adjustable to optimize the location of the hanger under the vehicle frame.

In one embodiment, when the grass catcher is in the grass collecting position, front link 140 may be spaced forwardly of the grass catcher, preferably at least about one inch forwardly of front panel 117 of the grass catcher. Front link 140 may be spaced forwardly from grass catcher front panel 117 sufficiently so that the operator can move the grass catcher forwardly and upwardly from the bail, away from the cutting unit, without disconnecting the hanger, the front link or the bail from each other. Then, while the hanger continues to pivotably support the front link, and the front link continues to pivotably support the bail, the operator can easily slide and remove the grass catcher transversely through either the left or right side of the carrier. Likewise, the operator may install the grass catcher by inserting it through either side of the carrier, and then sliding the grass catcher towards the cutting unit to the grass collecting position resting on the bail, without disconnecting the hanger, front link or bail.

Additionally, in one embodiment, hanger 144 may be positioned at least about one inch above top 120 of the grass catcher. As a result, the carrier provides a window between the bail, front link and hanger that is larger than the dimensions of either side 116 of the grass catcher, so that the grass catcher may be installed or removed from either side of the carrier through the window without disconnecting the carrier components. Installation or removal of the grass catcher from the side of the carrier, through the window formed by the carrier, may be done with the reel mower cutting unit raised or lowered.

Reel mower grass catcher carrier 126 may be used on any grass mowing machine having one or more reel mower cutting units, and especially reel mower cutting units mounted under a vehicle frame. For example, the reel mover grass catcher carrier may be used for reel mower cutting units on triplex riding greensmowers, trim mowers, or walk behind greensmowers.

Having described a preferred embodiment, it will become apparent that various modifications can be made without departing from the scope of the invention as defined in the accompanying claims.

The invention claimed is:

1. A reel mower grass catcher carrier, comprising:
a bail having side rods pivotably mounted to each side of a reel mower cutting unit and extending forwardly under a left side and a right side of a grass catcher;
a front link having an inverted U-shape and having first and second ends connected to the left side rod and the right side rod of the bail, and having a central portion extending forwardly in front of the grass catcher; and
a hanger extending forwardly over the grass catcher and connected to the central portion of the front link;
the bail, the front link, and the hanger supporting the grass catcher in a grass collecting position and in a side removal position that is spaced away from the reel mower cutting unit while the bail, the front link, and the hanger are connected together;
the bail, the front link, and the hanger forming a window larger than either side of the grass catcher.

2. The reel mower grass catcher carrier of claim 1 further comprising a closed loop on the forward end of the hanger through which the central portion of the front link extends.

3. The reel mower grass catcher carrier of claim 1 wherein the hanger is rigidly mounted to a lift arm.

4. The reel mower grass catcher carrier of claim 1 further comprising a cross rod extending between the left side rod and the right side rod of the bail.

5. The reel mower grass catcher carrier of claim 4 wherein the cross rod fits under and into a groove in a lower wall of the grass catcher between the left side and the right side of the grass catcher.

6. A reel mower grass catcher carrier, comprising:
a hanger extending over a grass catcher and pivotably supporting a front link; the front link spaced in front of the grass catcher; the front link pivotably supporting a bail that extends under the grass catcher;
the grass catcher resting on the bail in a grass collecting position and in a side removal position forward from the grass collecting position while the hanger pivotably supports the front link and the front link pivotably supports the bail.

7. The reel mower grass catcher carrier of claim 6 wherein the front link is an inverted U-shaped member.

8. The reel mower grass catcher carrier of claim 6 wherein the bail includes left and right side rods under the grass catcher and a cross rod extending between the left and right side rods.

9. The reel mower grass catcher carrier of claim 8 wherein a forward end of the left side rod is spaced from the other forward end of the right side rod.

10. A reel mower grass catcher carrier, comprising:
a hanger rigidly supported by and extending forwardly from a lift arm that pulls a reel mower cutting unit;
a bail attached to the front of the reel mower cutting unit;
a front link pivotably attached between the hanger and bail;
a grass catcher having opposing sides and a bottom surface supported by the hanger, the bail, and the front link in a grass collecting position, and in a side removal position forward from the grass collecting position and spaced away from the reel mower cutting unit, the hanger, the bail, and the front link defining a window that is larger than either of the opposing sides of the grass catcher.

11. The reel mower grass catcher carrier of claim 10 further comprising a closed loop on a forward end of the hanger.

12. The reel mower grass catcher carrier of claim 10 wherein the bail is pivotably mounted to the reel mower cutting unit.

* * * * *